US012083796B2

(12) United States Patent
Kobayashi et al.

(10) Patent No.: US 12,083,796 B2
(45) Date of Patent: Sep. 10, 2024

(54) INKJET RECORDING APPARATUS

(71) Applicant: KYOCERA Document Solutions Inc., Osaka (JP)

(72) Inventors: Kimihiko Kobayashi, Osaka (JP); Junichi Fukuoka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 118 days.

(21) Appl. No.: 17/936,256

(22) Filed: Sep. 28, 2022

(65) Prior Publication Data

US 2023/0099414 A1 Mar. 30, 2023

(30) Foreign Application Priority Data

Sep. 29, 2021 (JP) ................................ 2021-159309

(51) Int. Cl.
*B41J 2/045* (2006.01)

(52) U.S. Cl.
CPC ......... *B41J 2/04588* (2013.01); *B41J 2/0458* (2013.01); *B41J 2/04581* (2013.01)

(58) Field of Classification Search
CPC .. B41J 2/04588; B41J 2/0458; B41J 2/04581; B41J 2/04596
See application file for complete search history.

(56) References Cited

U.S. PATENT DOCUMENTS 10,946,641 B2 * 3/2021 Hasegawa ................ B41J 2/175
2021/0001628 A1 * 1/2021 Ozaki .................. B41J 2/04541

FOREIGN PATENT DOCUMENTS

JP 2019-166829 A 10/2019

OTHER PUBLICATIONS

Gardner, Deane A, Print System And Technique, Sep. 10, 2014, China (Year: 2014).*

* cited by examiner

*Primary Examiner* — Justin Seo
*Assistant Examiner* — Tracey M McMillion
(74) *Attorney, Agent, or Firm* — Studebaker & Brackett PC

(57) ABSTRACT

An inkjet recording apparatus includes a plurality of nozzles, a pressurizing element, a driver, a controller and a control circuit. The pressurizing element is provided for each of the nozzles. The driver drives the pressurizing elements. The controller generates image data indicating whether ink is ejected for each of the nozzles. The control circuit transmits ejection waveform data indicating a signal transmitted to the pressurizing element and the image data. After printing according to the image data transmitted to the driver is completed, in a non-printing state in which there is no image data to be subsequently printed, the control circuit transmits at least one of the image data indicating a blank sheet and the ejection waveform data in which the ink is not ejected, to the driver.

6 Claims, 13 Drawing Sheets

INKJET RECORDING APPARATUS

INCORPORATION BY REFERENCE

This application is based on and claims the benefit of priority from Japanese patent application No. 2021-159309 filed on Sep. 29, 2021, which is incorporated by reference in its entirety.

BACKGROUND

The present disclosure relates to an inkjet recording apparatus which ejects an ink to a sheet.

An inkjet recording apparatus which ejects an ink using a piezoelectric element is known. Specifically, the inkjet recording apparatus includes an inkjet head provided with the piezoelectric element, a driver for driving the piezoelectric element and a control circuit for controlling the driver. The control circuit transmits ejection waveform data and image data to the driver, and the driver transmits an ejection signal corresponding to the ejection waveform data to the piezoelectric element corresponding to a pixel assigned by the image data.

The ejection waveform data is selectively used according to a type of the sheet. For example, as the water absorbency of the sheet is higher, the ink ejection amount needs to be larger. Therefore, a plurality of types of the ejection waveform whose length and number of pulses of a voltage applied to the piezoelectric element are varied according to the type of the sheet are previously defined.

Since the register of the driver holds the data while the power is on, if electrical noise is generated during a waiting period (a period in which the power is on but printing is not performed), the driver may malfunction and output the ejection signal. In this case, the piezoelectric element is driven to eject the ink to the conveyance path, and the sheet is contaminated when the printing is performed.

If the function of attaching the cap to the inkjet head during the waiting period is provided, the ink ejection to the conveyance path is prevented by the cap. However, when the cap is attached, there is no problem as long as the cap is provided with a function for collecting the ink, but when the cap is not provided with the function for collecting the ink, the ink jet head is contaminated by the ink remaining between the cap and the inkjet head. Further, the cap is not necessarily attached immediately after the printing is completed, and in some cases, the printer waits without attaching the cap until a predetermined time elapses in preparation for a case where the printing is newly performed. In this case, the ink may be ejected to the conveyance path.

SUMMARY

In accordance with a first aspect of the present disclosure, an inkjet recording apparatus includes a plurality of nozzles, a pressurizing element, a driver, a controller and a control circuit. The pressurizing element is provided for each of the nozzles. The driver drives the pressurizing elements. The controller generates image data indicating whether ink is ejected for each of the nozzles. The control circuit transmits ejection waveform data indicating a signal transmitted to the pressurizing element and the image data. After printing according to the image data transmitted to the driver is completed, in a non-printing state in which there is no image data to be subsequently printed, the control circuit transmits at least one of the image data indicating a blank sheet and the ejection waveform data in which the ink is not ejected, to the driver.

The objects, features, and advantages of the present disclosure will become more apparent from the following description. In the detailed description, reference is made to the accompanying drawings, and preferred embodiments of the present disclosure are shown by way of example in the accompanying drawings.

DETAILED DESCRIPTION

Hereinafter, with reference to the attached drawings, a printer (an inkjet recording device) according to one embodiment in the present disclosure will be described.

Figure 1:
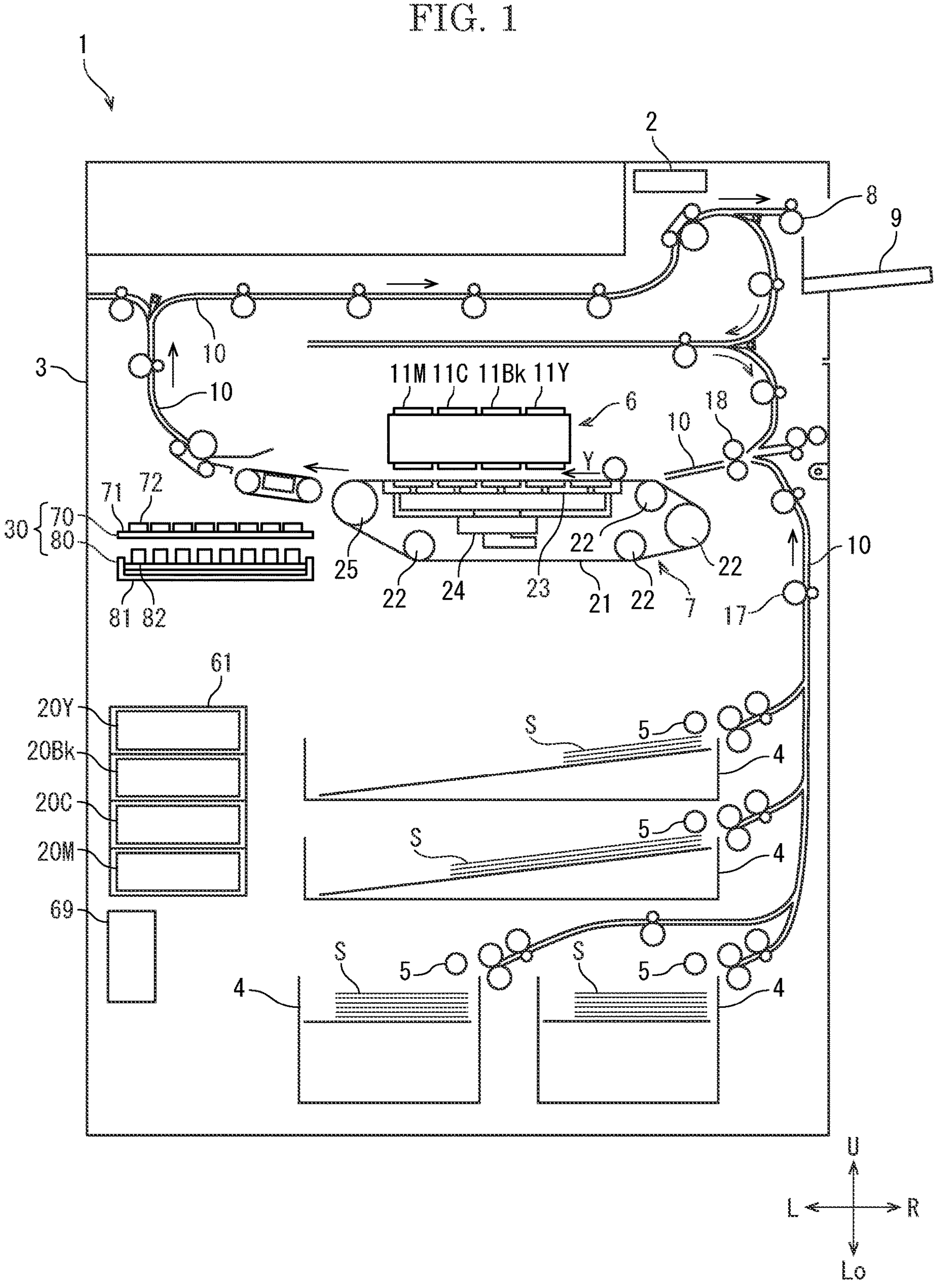
FIG. 1 is a front view showing an inner structure of a printer according to one embodiment of the present disclosure.
Figure 2:
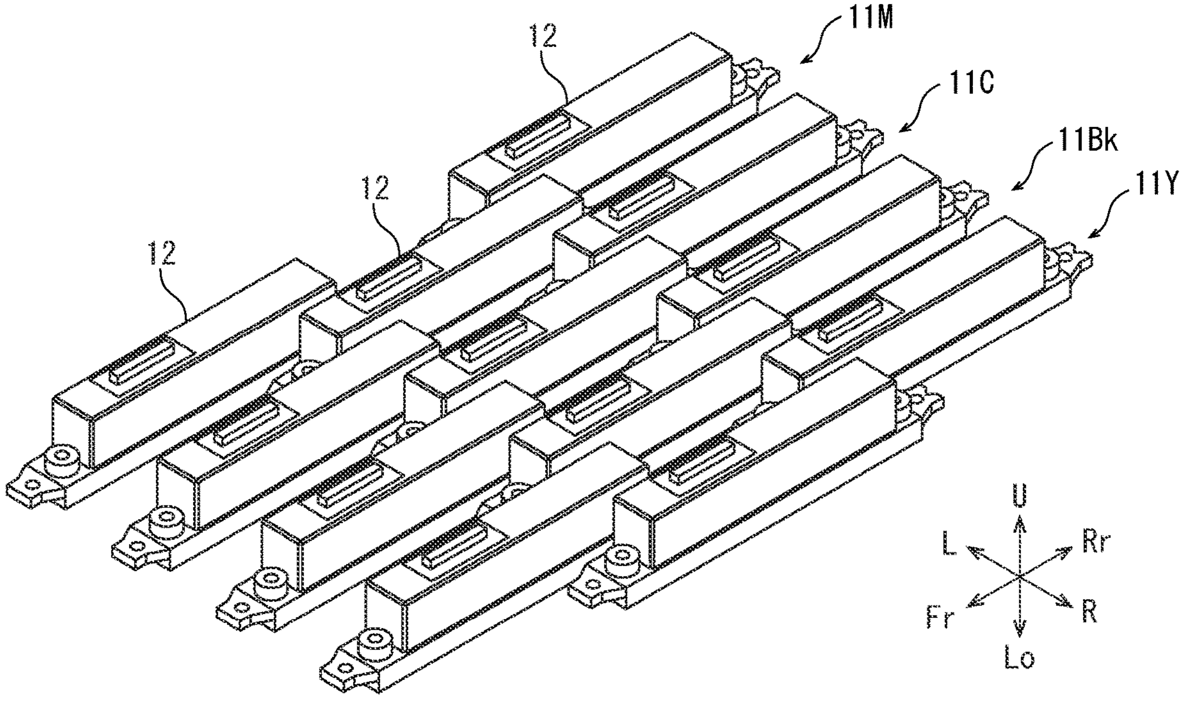
FIG. 2 is a perspective view showing an arrangement of inkjet heads according to the embodiment of the present disclosure.
Figure 3:
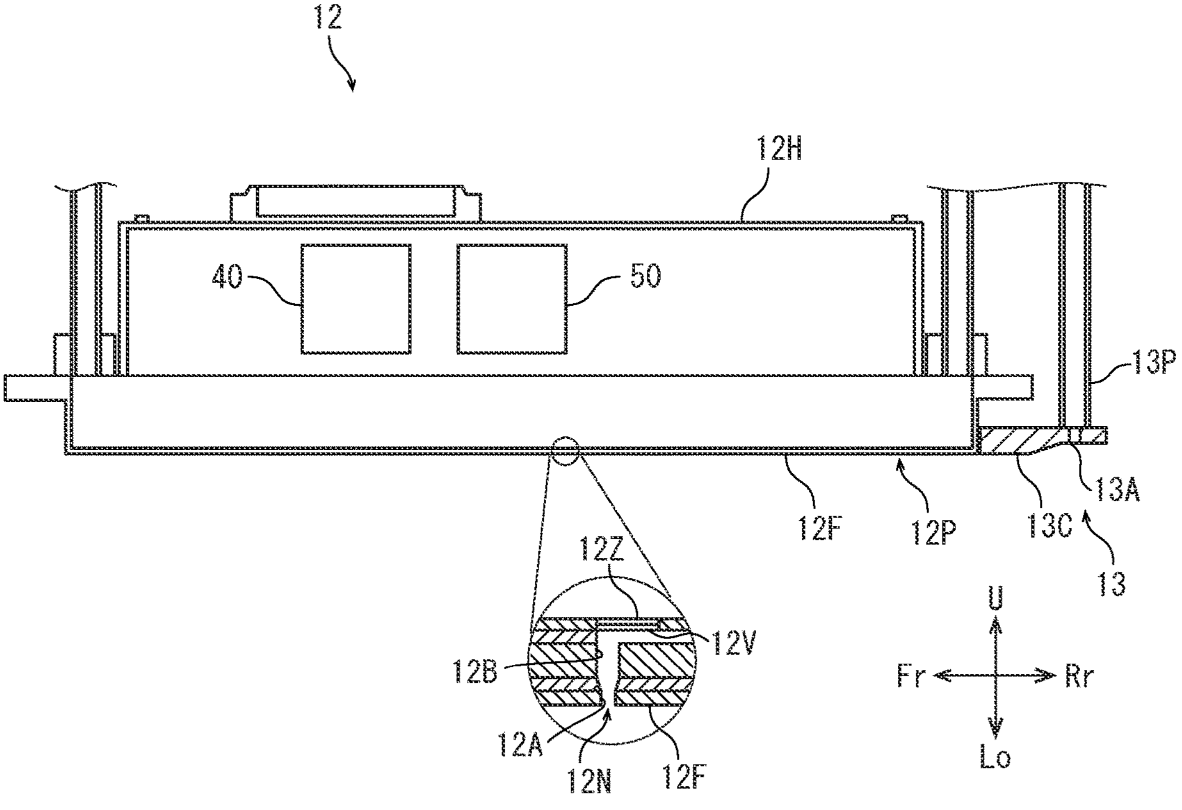
FIG. 3 is a sectional view showing the inkjet head according to the embodiment of the present disclosure.
Figure 4:
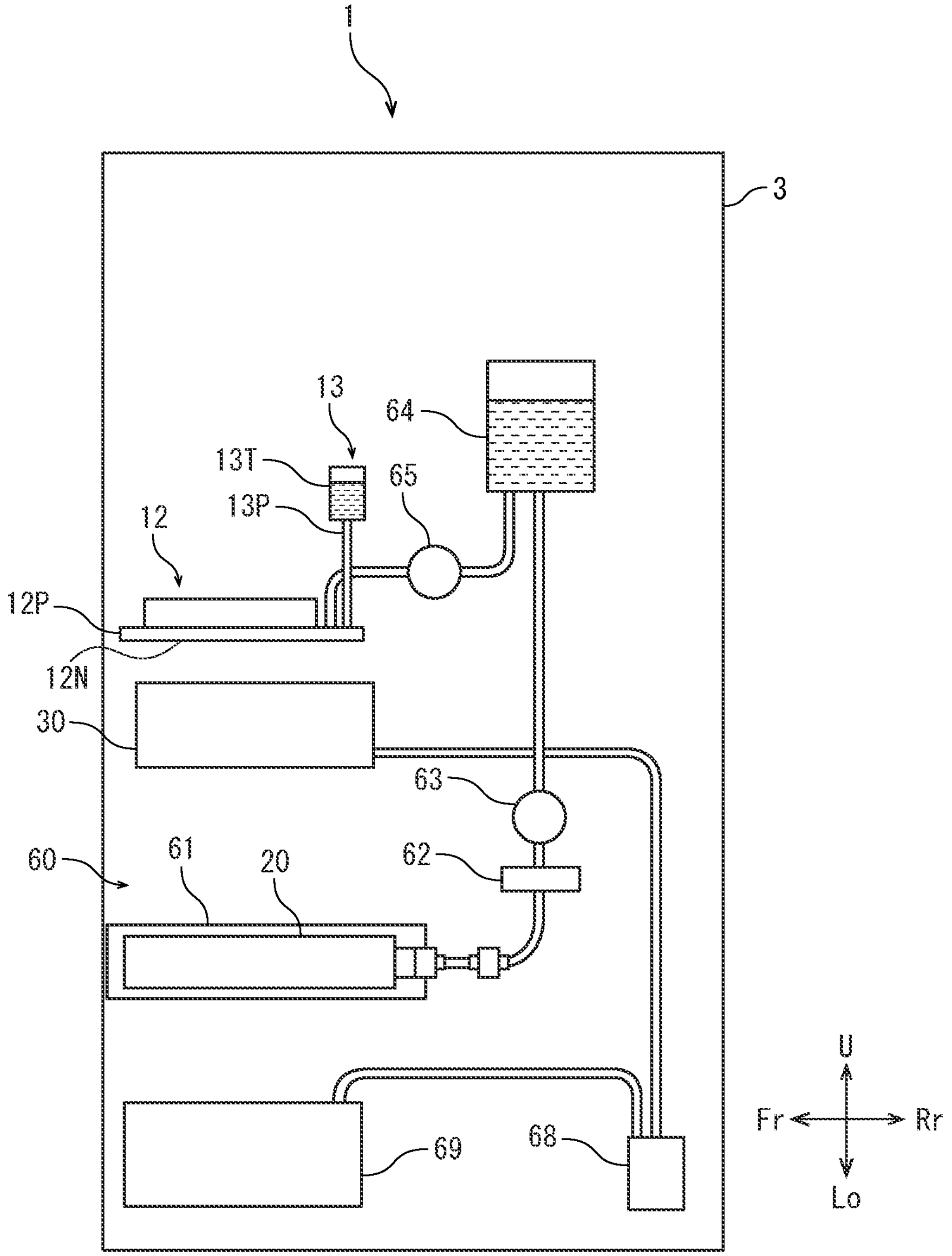
FIG. 4 is a view schematically showing an ink supplying part according to the embodiment of the present disclosure.

First, an entire structure of the printer 1 will be described. FIG. 1 is a front view schematically showing the inner structure of the printer 1. FIG. 2 is a perspective view showing an arrangement of inkjet heads 12. FIG. 3 is a sectional view of the inkjet head 12. FIG. 4 is a view schematically showing the ink supplying part 60. Hereinafter, the front side of the paper plane on which FIG. 1 is drawn is defined as the front side of the printer 1, and the left-and-right direction will be described based on the direction in which the printer 1 is viewed from the front side. In each of the drawings, U, Lo, L, R, Fr and Rr indicate an upper, a lower, a left, a right, a front, and a rear, respectively.

The printer 1 (see FIG. 1) includes a rectangular parallelepiped body housing 3. In the lower portion in the body housing 3, a sheet feeding cassette 4 in which a sheet S, such as a plain paper, a coated paper or the like is stored and a sheet feeding roller 5 which feeds the sheet S rightward from the sheet feeding cassette 4 are provided. Above the sheet feeding cassette 4, a conveying unit 7 which attracts the sheet S and conveys it in the Y direction is provided. Above the conveying unit 7, an image forming unit 6 which ejects ink to form an image is provided. In the right upper portion in the body housing 3, a sheet discharge roller 8 which discharges the sheet S on which the image is formed and a sheet discharge tray 9 on which the discharged sheet S is staked are provided.

Inside the body housing 3, a conveyance path 10 from the sheet feeding roller 5 to the sheet discharge roller 8 via a gap between the conveying unit 7 and the image forming unit 6 is provided. The conveyance path 10 is formed mainly of plate-like members facing each other with a gap through which the sheet S is passed, and a conveying roller 17 which holds the sheet S and conveys it is provided at a plurality of positions in the conveying direction Y. A registration roller 18 is provided on the upstream side of the image forming unit 6 in the conveying direction Y.

The conveying unit 7 includes an endless conveying belt 21, a supporting plate 23 and a suction part 24. The conveying belt 21 has a number of air holes (not shown), and is stretched around a driving roller 25 and a driven roller 22. The supporting plate 23 has a number of air holes, and the upper surface thereof is in contact with the inner surface of the conveying belt 21. The suction part 24 attracts the sheet S to the conveying belt 21 by sucking air through the air holes of the supporting plate 23 and the air holes of the conveying belt 21. When the driving roller 25 is driven in the counterclockwise direction by a driving part (not shown) including a motor and a reduction gear, the conveying belt 21 is traveled in the counterclockwise direction, and the sheet S attracted to the conveying belt 21 is conveyed in the Y direction.

The image forming unit 6 includes head units 11Y, 11Bk, 11C and 11M (collectively referred to as the head unit 11) which eject yellow, black, cyan and magenta ink, respectively. Ink containers 20Y, 20Bk, 20C and 20M (collectively referred to as the ink container 20) filled with the yellow, black, cyan and magenta ink are connected to the head units 11Y, 11Bk, 11C and 11M, respectively.

The head unit 11 includes one or more inkjet heads 12, for example, three inkjet heads 12 arranged in a zigzag pattern (see FIG. 2). The inkjet head 12 (see FIG. 3) includes a rectangular parallelepiped housing 12H whose longitudinal direction is along the front-and-rear direction, and a nozzle plate 12P provided on the bottom of the housing 12H. The nozzle plate 12P includes a large number of nozzles 12N arranged in the front-and-rear direction. The nozzle 12N has a branch channel 12B branched from a channel connected to a tank 64 and an ejection port 12A provided on the nozzle surface 12F. A diaphragm 12V constitutes a part of the inner wall of the branch channel 12B. Each of the diaphragm 12V is provided with a pressurizing element 12Z. The housing 12H is provided with a driver 50 for driving the pressurizing element 12Z and a control circuit 40 for controlling the driver 50. As the pressurizing element 12Z, a piezoelectric element, an electrostatic element (electrostatic actuator), a heating element (used in a thermal inkjet system), or the like are used.

The printer 1 includes an ink supplying part 60 (see FIG. 4). Although the ink supplying part 60 corresponding to one color ink is shown in FIG. 1, since the four colors ink are used in this embodiment, four similar ink supplying parts 60 are provided. The printer 1 includes a container attachment part 61 to which the ink container 20 is attached, a filter 62 which filters the ink, a pump 63 which sucks the ink from the ink container 20 through the filter 62, a sub-tank 64 which stores the ink fed from the pump 63, and a pump 65 which supplies the ink stored in the sub-tank 64 to the head unit 11.

The controller 2 (see FIG. 1) includes an arithmetic part and a storage part. The arithmetic part is a CPU (Central Processing Unit), for example. The storage part includes a storage medium such as ROM (Read Only Memory), RAM (Random Access Memory), EEPROM (Electrically Erasable Programmable Read Only Memory), or the like. The arithmetic part executes various processes by reading and executing the control program stored in the storage part. The controller 2 may be implemented by an integrated circuit that does not use software.

On the upper portion of the body housing 3, an operation part is provided (not shown). The operation part includes a display panel, a touch panel superposed on the display surface of the display panel, and a keypad adjacent to the display panel. The controller 2 displays an operation menu of the printer 1 and a screen showing a status or the like on the display panel, and controls each part of the printer 1 according to an operation detected by the touch panel and the keypad.

The basic image forming operation of the printer 1 is as follows. When an image forming job is inputted to the printer 1 from the operation part or an external computer or the like, the sheet feeding roller 5 feeds the sheet S from the sheet feeding cassette 4 to the conveyance path 10, and the registration roller 18 whose rotation is stopped corrects the skew of the sheet S. When the registration roller 18 feeds the sheet S to the conveying unit 7 at a predetermined timing, in the conveying unit 7, the sheet S is attracted to the conveying belt 21 and conveyed in the Y direction. When the controller 2 supplies raster image data to the control circuit 40 in synchronism with the conveying of the sheet S, the driver 50 supplies an ejection signal corresponding to the image data to the pressurizing element 12Z, and the ink is ejected from the nozzle 12N to form an image on the sheet S. The sheet discharge roller 8 discharges the sheet S on which the image is formed to the sheet discharge tray 9.

Figure 5:
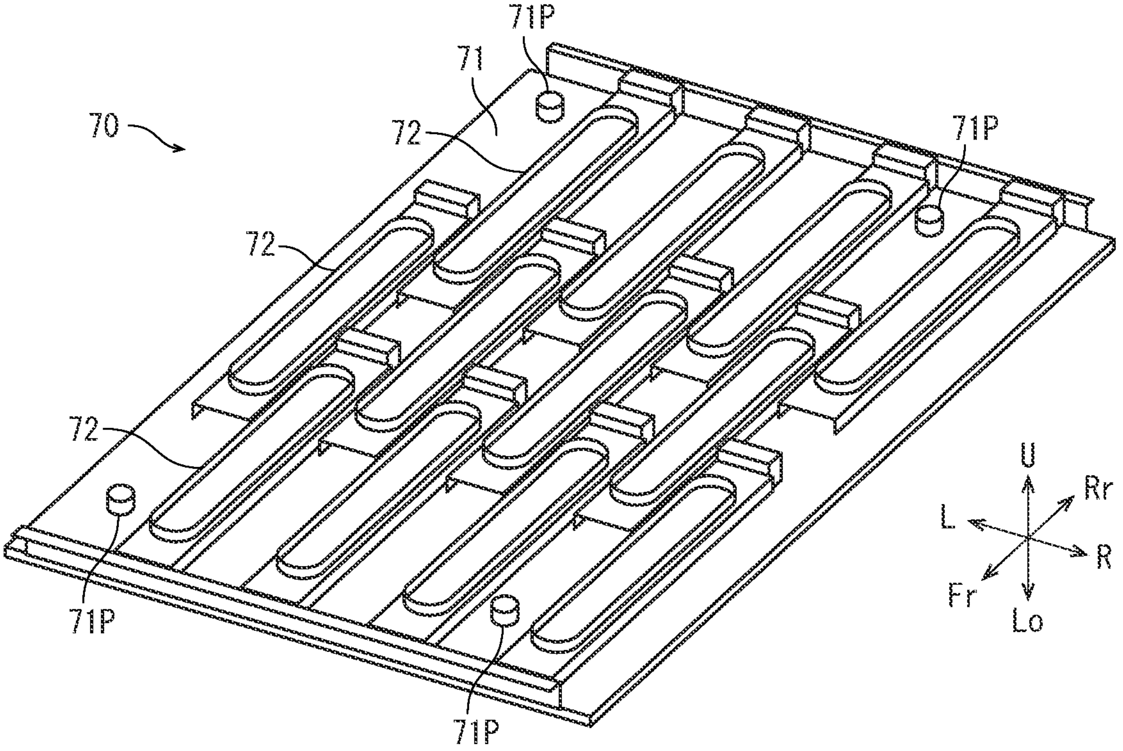
FIG. 5 is a perspective view showing a cap unit according to the embodiment of the present disclosure.
Figure 6:
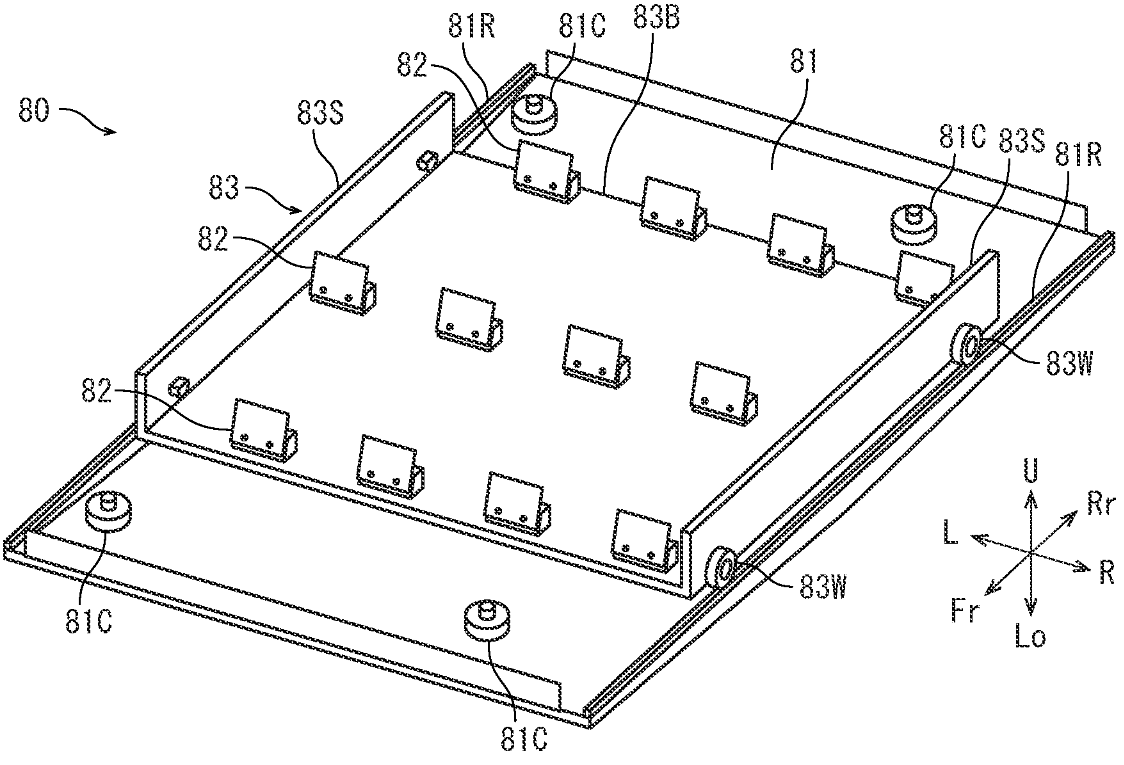
FIG. 6 is a perspective view showing a wipe unit according to the embodiment of the present disclosure.
Figure 7:
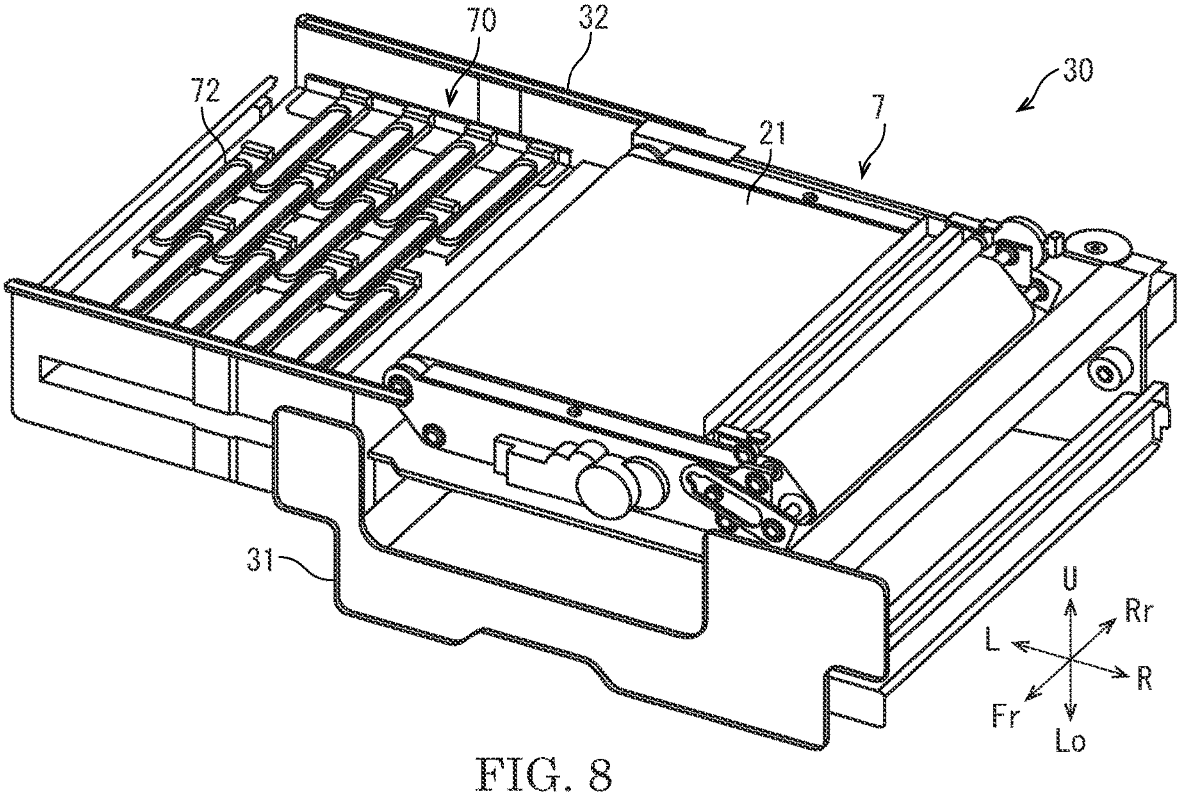
FIG. 7 is a perspective view showing a maintenance device according to the embodiment of the present disclosure.
Figure 8:
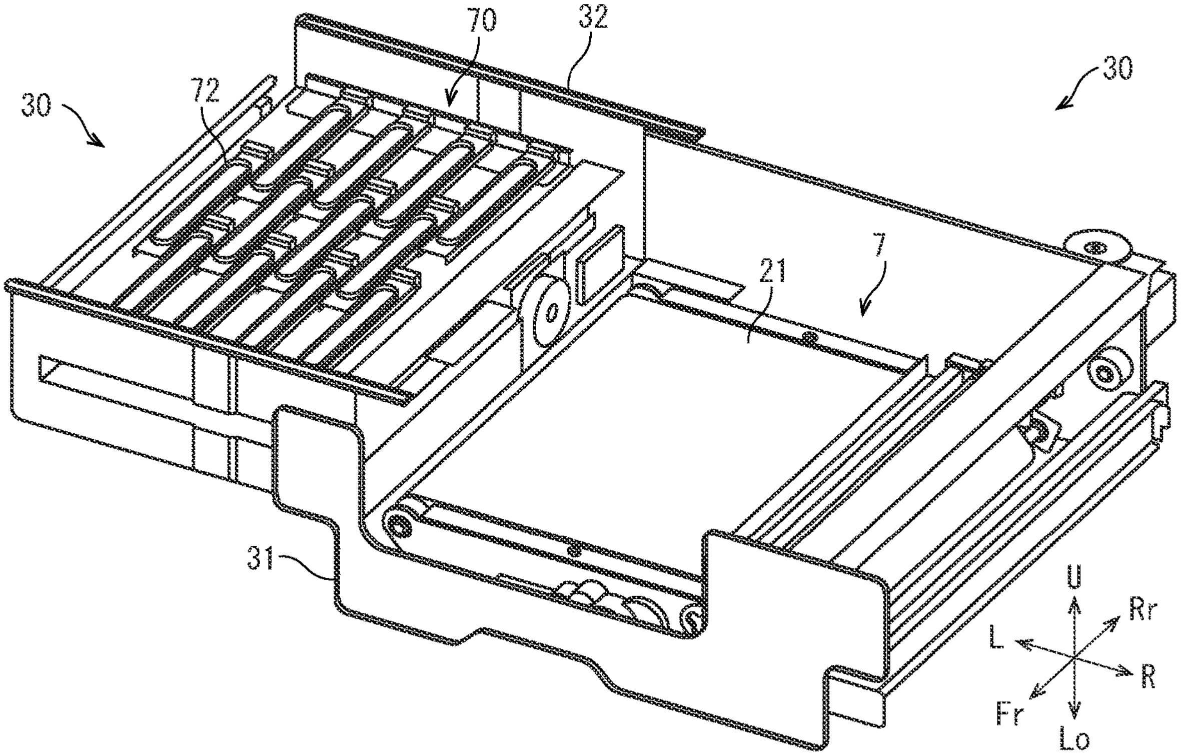
FIG. 8 is a perspective view showing the maintenance device according to the embodiment of the present disclosure.
Figure 9:
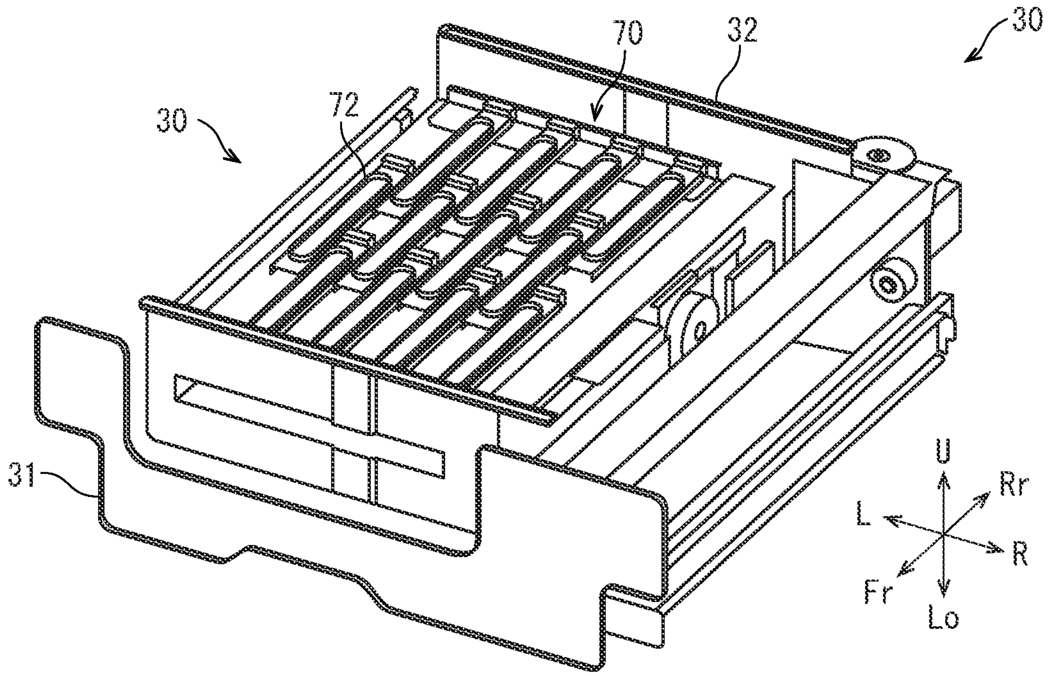
FIG. 9 is a perspective view showing the maintenance device according to the embodiment of the present disclosure.
Figure 10:
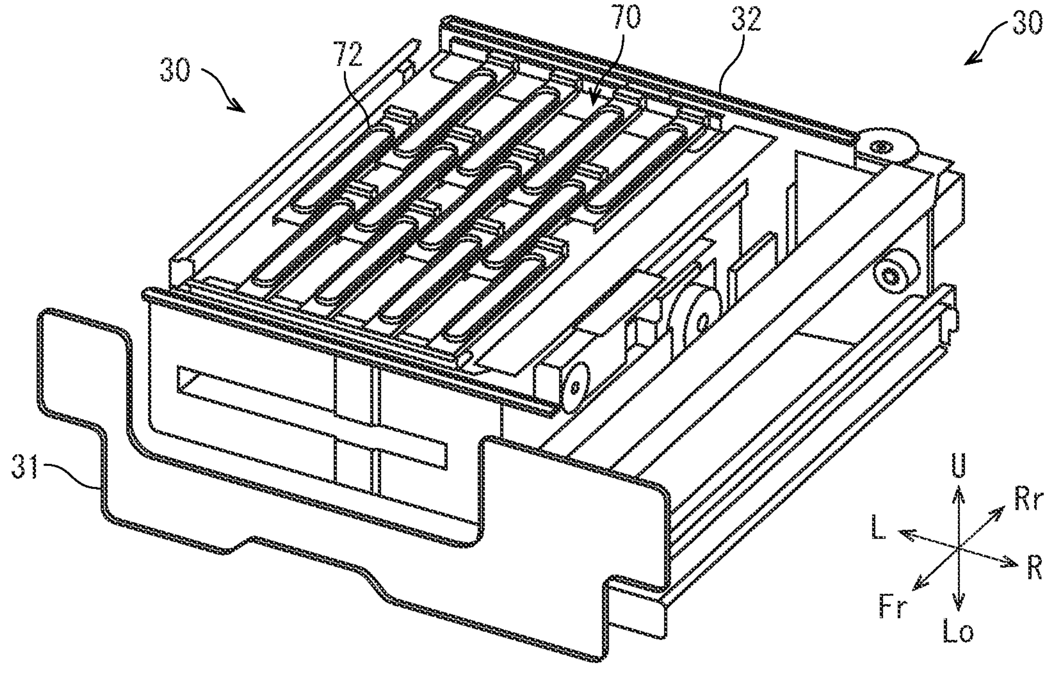
FIG. 10 is a perspective view showing the maintenance device according to the embodiment of the present disclosure.

Next, a structure of a maintenance device 30 (see FIG. 1 and FIG. 4) will be described. The maintenance device 30 includes a cap unit 70 and a wipe unit 80. FIG. 5 is a perspective view showing the cap unit 70. FIG. 6 is a perspective view showing the wipe unit 80. FIG. 7 to FIG. 12 are perspective views showing the maintenance device 30. In FIG. 7 to FIG. 12, some details of the cap unit 70 and the wipe unit 80 are omitted.

[Wipe Unit] The wipe unit 80 (see FIG. 6) includes a supporting plate 81 and a blade unit 83 sliding relative to the supporting plate 81. The blade unit 83 includes blades 82 which come into contact with the nozzle surface 12F of the inkjet head 12.

The supporting plate 81 is a plate-like member, and its upper surface is inclined so as to be lower toward the center from both the front and rear ends. A discharge port for discharging waste ink is provided at the lowest portion of the upper surface of the supporting plate 81 (not shown). A suction pump 68 and a waste ink tank 69 are connected to the discharge port (see FIG. 4). A rail 81R whose longitudinal direction is along the front-and-rear direction is provided at both right and left end portions of the supporting plate 81. A connection portion 81C protruding upward is provided at both the front and rear end portions of the upper surface of the supporting plate 81.

The blade unit 83 includes the blades 82, a plate-shaped bottom part 83B supporting the blades 82, and side wall parts 83S provided on both the right and left end portions of the bottom part 83B. The blade 82 is a flexible plate-like member made of rubber or the like. The blades 82 corresponding to the inkjet heads 12 are arranged in the zigzag pattern on the upper surface of the bottom part 83B. In the vicinities of the front and rear end portions of the left and right side wall parts 83S, a wheel 83W supported by a shaft whose axial direction is along the left-and-right direction is provided. The blade unit 83 is provided with a driving part (not shown). The driving part includes a driving source such as a motor and a reduction mechanism such as a gear train, and transmits driving force to the wheels 83W. The rails 81R guide the rolling of the wheels 83W in the front-and-rear direction.

[Cap Unit] The cap unit 70 (see FIG. 5) includes caps 72 and a supporting plate 71 on which the caps 72 are supported. The caps 72 corresponding to the inkjet heads 12 are arranged in the zigzag pattern on the upper surface of the supporting plate 71. The cap 72 is made of resin, such as rubber, and has a concave shape whose upper surface is opened. The caps 72 are attached to the supporting plate 71 with compression springs (not shown). When the caps 72 are pressed against the nozzle surface 12F, the caps 72 and the nozzle surface 12F are brought into close contact by the elastic deformation of the compression springs and the caps 72 themself.

On the lower surface of the supporting plate 71 of the cap unit 70, a connection portion (not shown) protruding downward is provided at positions corresponding to the connection portions 81C of the wipe unit 80. The lower end of the connection portion is recessed upward, and the connection portion 81C of the wipe unit 80 is fitted therein. At positions corresponding to the connection portions on the upper surface of the supporting plate 71 of the cap unit 70, a positioning pin 71P is provided. When the cap unit 70 is pressed against the nozzle surface 12F, the positioning pins 71P come into contacts with the image forming unit 6 to position the cap unit 70 in the height direction.

[Frame, Carriage] A frame 31 (see FIG. 7) is fixed to the housing 3, has an upper opening, a lower opening and a left opening, and supports a carriage 32 and the conveying unit 7. The carriage 32 has an upper opening, a lower opening and a left opening, and supports the wipe unit 80 and the cap unit 70. The cap unit 70 is disposed above the wipe unit 80.

[Lifting Mechanism] The frame 31 is provided with a lifting mechanism (not shown). The lifting mechanism includes a driving source such as a motor, a reduction mechanism such as a gear train, and a conversion mechanism (endless belt, rack and pinion, ball screw or the like) which converts rotational motion into linear motion, and lifts and lowers the conveying unit 7 with respect to the frame 31. The lifting mechanism lifts and lowers the conveying unit 7 between an image forming position (see FIG. 7) at the time of the image forming operation and a lower retracting position (see FIG. 8) below the image forming position. At the image forming position, the conveying unit 7 is positioned so that a distance between the conveying belt 21 and the nozzle surface 12F is about 1 mm. At the lower retracting position, a space in which the cap unit 70 and the wipe unit 80 are stored is formed between the upper surface of the conveying belt 21 and the nozzle surface 12F.

[Sliding Mechanism] The frame 31 is provided with a sliding mechanism (not shown). The sliding mechanism includes a rail whose longitudinal direction is along the left-and-right, a driving source such as a motor, a reduction mechanism such as a gear train, and a conversion mechanism (endless belt, rack and pinion, ball screw or the like) which converts rotational motion into linear motion, and slides the carriage 32 in the left-and-right direction along the rail.

The wipe unit 80 is supported by the carriage 32, and can slide in the left-and-right direction together with the carriage 32 by the sliding mechanism. The cap unit 70 is also supported by the carriage 32, but the cap unit 70 can slide in the left-and-right direction with respect to the carriage 32. This configuration allows a moving state (see FIG. 9) in which the cap unit 70 and the wipe unit 80 are moved to facing positions (positions so as to face the image forming unit 6) by the carriage 32, and a moving state (see FIG. 11) in which only the wipe unit 80 is moved to the facing position by the carriage 32 while leaving the cap unit 70 at the side retreating position (position so as not to face the image forming unit 6).

At the facing position, the cap unit 70 and the wipe unit 80 can be lifted and lowered by using the conveying unit 7. Specifically, the conveying unit 7 can be lifted and lowered inside the carriage 32 in a state where only the cap unit 70 or both the cap unit 70 and the wipe unit 80 are placed on the upper portion of the conveying unit 7. The lifting mechanism lifts and lowers the cap unit 70 between the facing position (see FIG. 9) and a cap position (see FIG. 10). The cap position is a position where the cap 72 is pressed against the nozzle surface 12F. The lifting mechanism lifts and lowers the wipe unit 80 between the facing position (see FIG. 11) and ae wipe position (see FIG. 12). The wipe position is a position where the upper end of the blade 82 comes into contact with the nozzle surface 12F.

[Cleaning Liquid Supplying Part] The inkjet head 12 is provided with a cleaning liquid supplying part 13 which supplies a cleaning liquid (see FIG. 4). The cleaning liquid supplying part 13 includes a cleaning liquid tank 13T storing the cleaning liquid, a connection member 13C provided on the rear side of the nozzle plate 12P, and a pipe 13P connecting the cleaning liquid tank 13T and the connection member 13C. The connection member 13C has a supply port 13A penetrating in the upper-and-lower direction. A convex meniscus is formed at the lower end of the supply port 13A by adjusting the height of the cleaning liquid tank 13T, adjusting the pressure in the cleaning liquid tank 13T, or the others, and the cleaning liquid swelling from the supply port 13A is wiped by the blade 82 to supply the cleaning liquid to the nozzle surface 12F.

Next, a basic operation of the maintenance device 30 will be described. The following operation is performed by the controller 2 controlling each part of the maintenance device 30.

When the image forming operation is performed (see FIG. 7), the cap unit 70 and the wipe unit 80 are disposed at the side retracting positions together with the carriage 32, and the conveying unit 7 is disposed at the image forming position.

Figure 11:
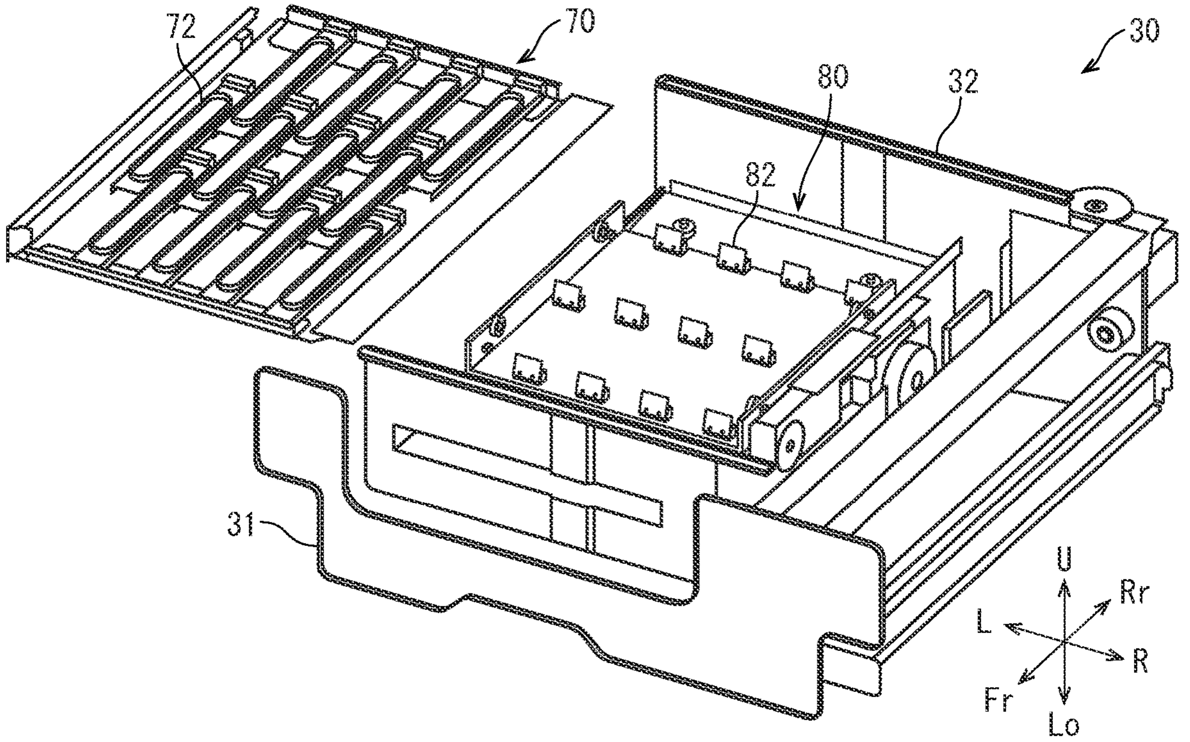
FIG. 11 is a perspective view showing the maintenance device according to the embodiment of the present disclosure.
Figure 12:
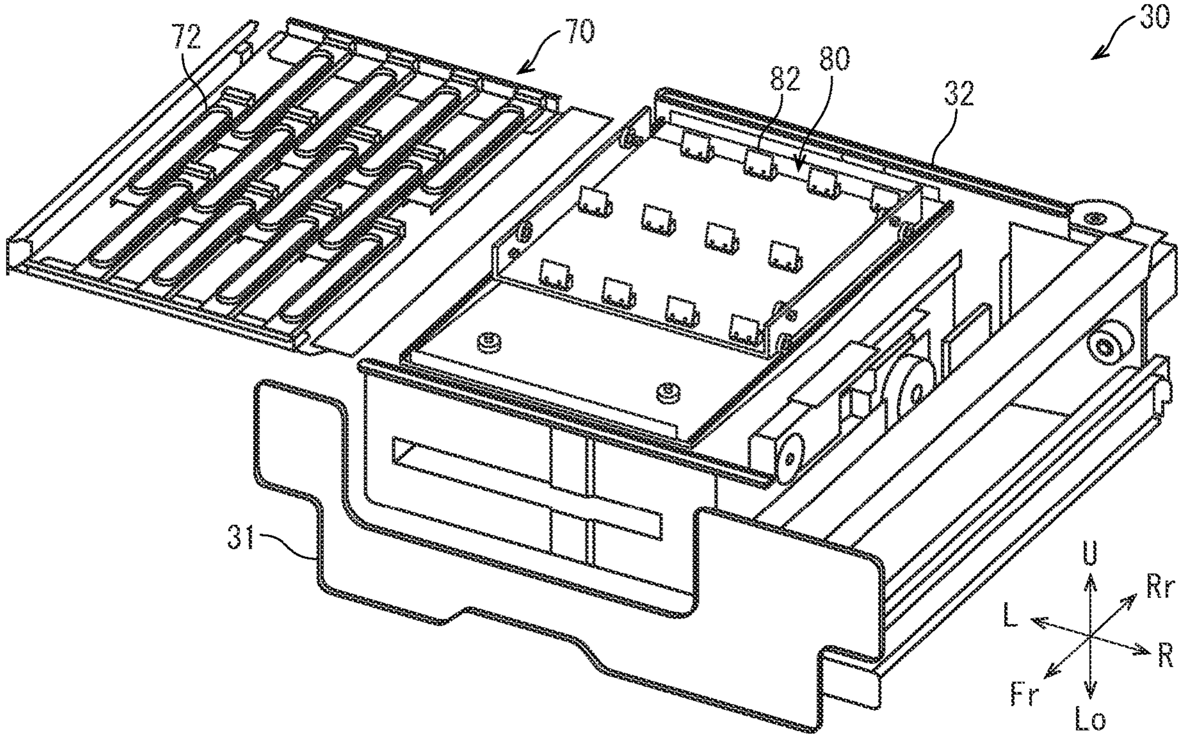
FIG. 12 is a perspective view showing the maintenance device according to the embodiment of the present disclosure.

When the purge processing and the wipe processing are performed, the controller 2 moves the conveying unit 7 to the lower retreating position by the lifting mechanism (see FIG. 8), and moves the carriage 32 and the wipe unit 80 to the facing positions by the sliding mechanism while leaving the cap unit 70 at the side retreating position (see FIG. 11). At this time, since the blade unit 83 is disposed at a center initial position in the front-and-lower direction of the cap unit 70, the controller 2 moves the blade unit 83 to the sliding start position at the rear end of the slidable range, and lifts the conveying unit 7 to move the wipe unit 80 to the wipe position (see FIG. 12). Subsequently, the controller 2 increases the pressure in the nozzle of the inkjet head 12 to eject the ink, swells the cleaning liquid from the supply port 13A by the cleaning liquid supplying part 13, and slides the blade unit 83 forward. Then, the blades 82 wipe the cleaning liquid from the supply port 13A, and dilutes and removes the ink adhering to the nozzle surface 12F while coming into contact with the nozzle surface 12F and being deflected.

Next, the cap unit 70 is attached to the image forming unit 6. The controller 2 lowers the conveying unit 7 to the lower retracting position by the lifting mechanism to lower the wipe unit 80 to the facing position, and moves the blade unit 83 to the initial position (see FIG. 11). Next, the controller 2 moves the carriage 32 and the wipe unit 80 to the side retreating position by the sliding mechanism (see FIG. 8). Subsequently, the controller 2 moves the carriage 32, the cap unit 70 and the wipe unit 80 to the facing positions by the sliding mechanism (see FIG. 9), and lifts the conveying unit 7 by the lifting mechanism to lift the cap unit 70 to the cap position via the wipe unit 80 (see FIG. 10). Thus, the caps 72 are pressed against the nozzle surface 12F to prevent thickening and drying of the ink in the nozzle 12N. The lifting mechanism and the sliding mechanism are examples of the attaching/detaching mechanisms which attaches and detaches the cap 72 to and from the nozzle surface 12F.

Figure 13:
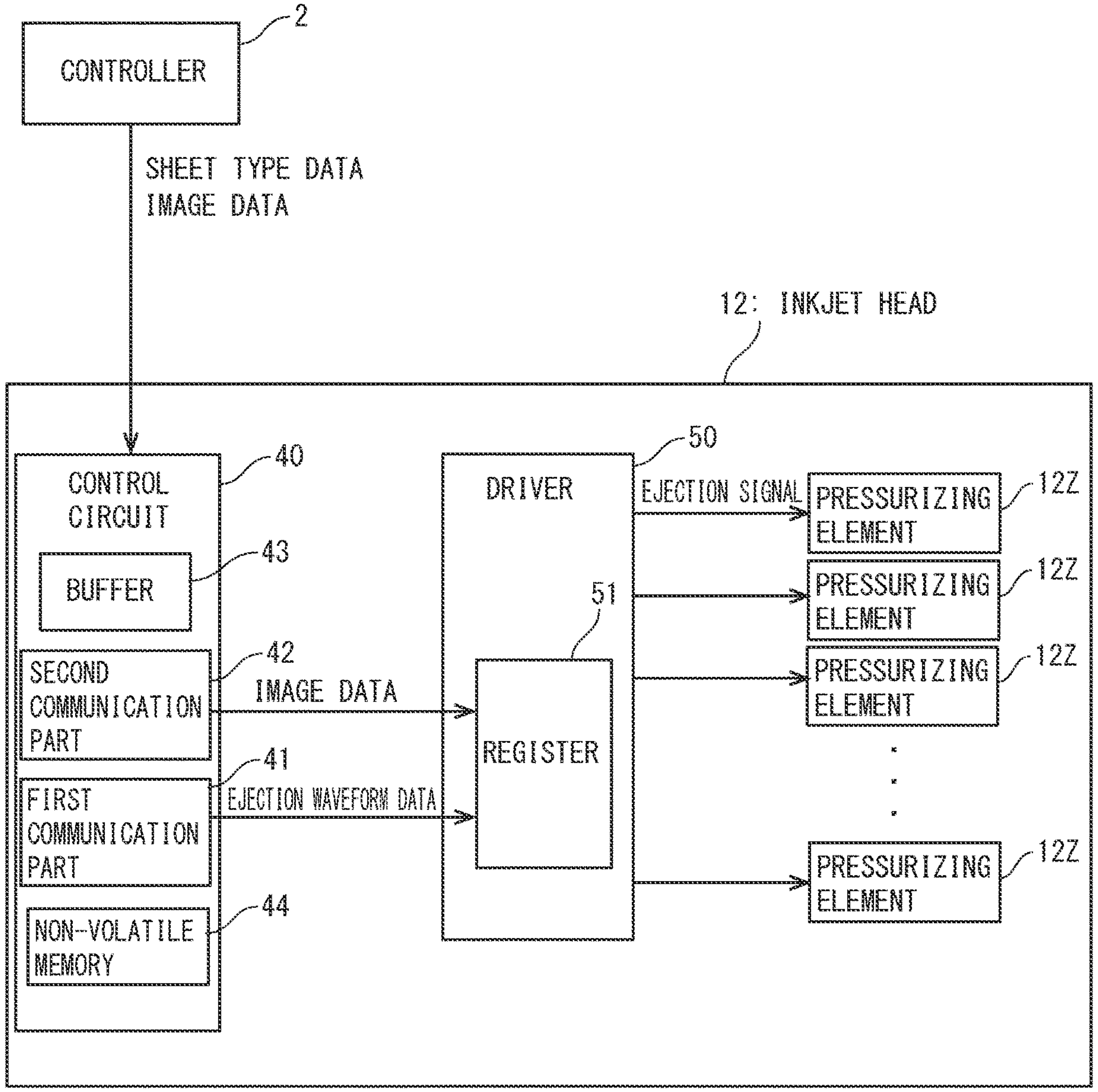
FIG. 13 is a block diagram showing an electrical configuration of the inkjet head according to the embodiment of the present disclosure.
Figure 14:
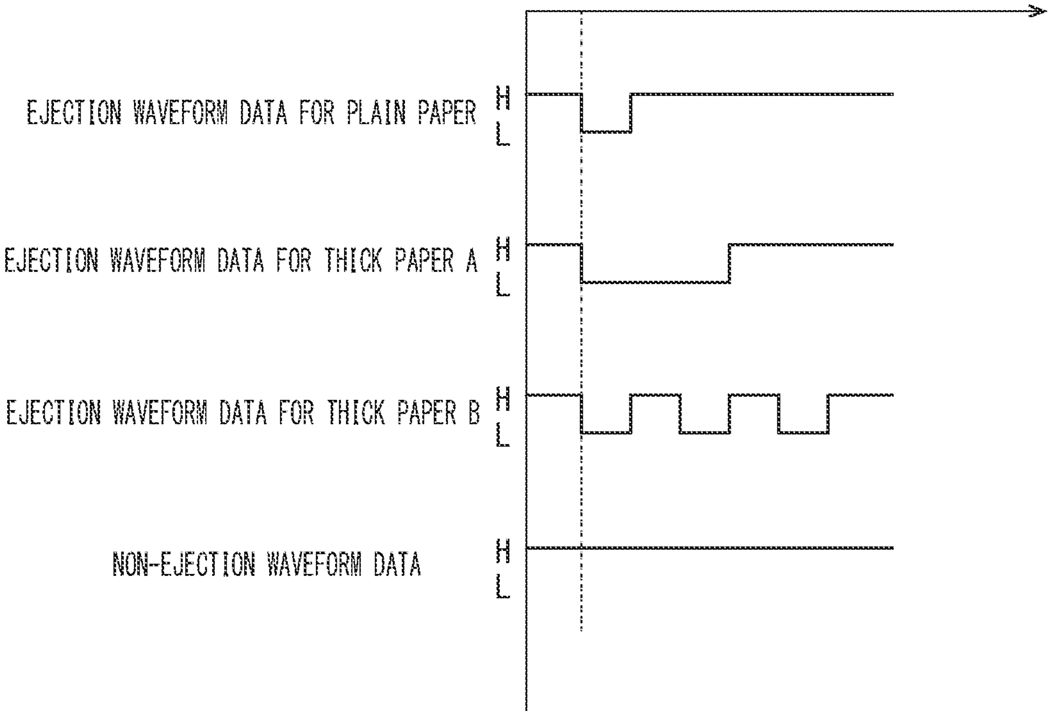
FIG. 14 is a timing chart showing ejection waveform data according to the embodiment of the present disclosure.

Next, the control of the inkjet head 12 will be described in detail. FIG. 13 is a block diagram explaining the electrical configuration of the inkjet head 12. FIG. 14 is a timing chart showing ejection waveform data.

The printer 1 includes a plurality of the nozzles 12N; the pressurizing element 12Z provided for each of the nozzles 12N; the driver 50 which drives the pressurizing elements 12Z; a controller 2 which generates image data indicating whether ink is ejected for each of the nozzles 12N; and a control circuit 40 which transmits ejection waveform data indicating a signal transmitted to the pressurizing element 12Z and the image data, wherein after printing according to the image data transmitted to the driver 50 is completed, in a non-printing state in which there is no image data to be subsequently printed, the control circuit 40 transmits at least one of the image data indicating a blank sheet and the ejection waveform data in which the ink is not ejected, to the driver 50.

Since the nozzle 12N and the pressurizing element 12Z are as described above, other components will be described below. The driver 50 will be described later.

[Controller, Sheet Type Data, Image Data] The controller 2 rasterizes document data (written in page description language, bitmap, or the like) included in the print job in accordance with the output resolution of the inkjet head 12, and converts the rasterized document data into image data in a raster format indicating whether the ink is ejected for each nozzle 12N. The sheet type data is data indicating the type (for example, a plain paper, a thick paper, or the like) of the sheet S assigned in the print job. The controller 2 transmits the sheet type data and the image data to the control circuit 40 at a timing matched with the conveying speed of the conveying unit 7. When the document data represents a document of a plurality of pages, the controller 2 transmits the sheet type data and the image data in association with each page.

[Control Circuit] The control circuit 40 is an integrated circuit including a buffer 43, a nonvolatile memory 44, a first communication part 41 and a second communication part 42.

[Buffer] The buffer 43 is a volatile memory such as RAM, and inputs and outputs the data in a FIFO (First In, First Out) method. The control circuit 40 causes the buffer 43 to store the image data received from the controller 2 and transmits it to the driver 50. The image data transmitted to the driver 50 is erased from the buffer 43.

[Nonvolatile memory, Ejection Waveform Data] The nonvolatile memory 44 is an EEPROM or the like, and stores the ejection waveform data. The ejection waveform data is data indicating a signal sent to the pressurizing element 12Z. The signal is a waveform of a voltage to be applied, for example. The waveform is a pulse, for example, and a plurality kinds of ejection waveform data whose length and number of pulses are changed in accordance with the type of the sheet S are previously stored in the nonvolatile memory 44 (see FIG. 14). The control circuit 40 reads the ejection waveform data corresponding to the sheet type data received from the controller 2 from the nonvolatile memory 44, and transmits it to the driver 50. The control circuit 40 cases the sheet type data received from the controller 2 to store in the nonvolatile memory 44.

The ejection waveform data is represented by two values of H (high level) and L (low level), where H indicates that the ink is not ejected and L indicates that the ink is ejected. The ejection waveform data for plain paper is ejection waveform data in which L continues for a predetermined time, and is used when printing on a plain paper. The ejection waveform data A for thick paper is ejection waveform data in which L continues for an integral multiple (in this example, three times) of the time of the ejection waveform data for plain paper, and is used when printing on a thick paper thicker than a plain paper. The ejection waveform data B for thick paper may be used in place of the ejection waveform data A for thick paper. The ejection waveform data B for thick paper is ejection waveform data in which a pulse of the ejection waveform data for plain paper is repeated for a plurality of times (in this example, three times). The non-ejection waveform data is ejection waveform data in which H continues without switching to L.

The control circuit 40 stores the type of the latest ejection waveform data transmitted to the driver 50. For example, the control circuit 40 associates a flag with each of the ejection waveform data and causes the nonvolatile memory 44 to store the flag. When the ejection waveform data is transmitted to the driver 50, the control circuit 40 rewrites the flag of the transmitted ejection waveform data to “1” and rewrites the flag of the other ejection waveform data to “0”.

[First Communication Part, Second Communication Part] The first communication part 41 and the second communication part 42 are communication interfaces which transmits a signal in a V-by-one (registered trademark) system, for example. The control circuit 40 transmits the ejection waveform data to the driver 50 by using the first communication part 41, and transmits the image data to the driver 50 by using the second communication part 42. The communication speed of the first communication part 41 is slower than that of the second communication part 42. Therefore, the transmission of the ejection waveform data via the first communication part 41 requires a longer time than the transmission of the image data via the second communication part 42.

[Driver] The driver 50 is an integrated circuit including a register 51. The register 51 holds the stored contents while the power is turned on. Therefore, only when updating is necessary, the control circuit 40 transmits the ejection waveform data and the image data to the driver 50, thereby suppressing the communication amount. For example, only when the type of the sheet S indicated by the sheet type data is changed, the control circuit 40 transmits the ejection waveform data and the image data corresponding to the type after changing, and transmits the image data only while the type of the sheet S is not changed. When a plurality of sheets are printed with the same image data without changing the type of the sheet S, the image data is transmitted only once, and the sheet number data indicating the number of sheets assigned in the print job is transmitted.

The driver 50 transmits an ejection signal to the pressurizing element 12Z based on the ejection waveform data and the image data stored in the register 51. That is, the driver 50 transmits the ejection signal corresponding to the ejection waveform data to the pressurizing element 12Z corresponding to the nozzle 12N for which the ejection of ink is assigned by the image data. On the other hand, the driver 50 does not transmit the ejection signal to the pressurizing element 12Z corresponding to the nozzle 12N for which the ejection of ink is not assigned by the image data.

Figure 15:
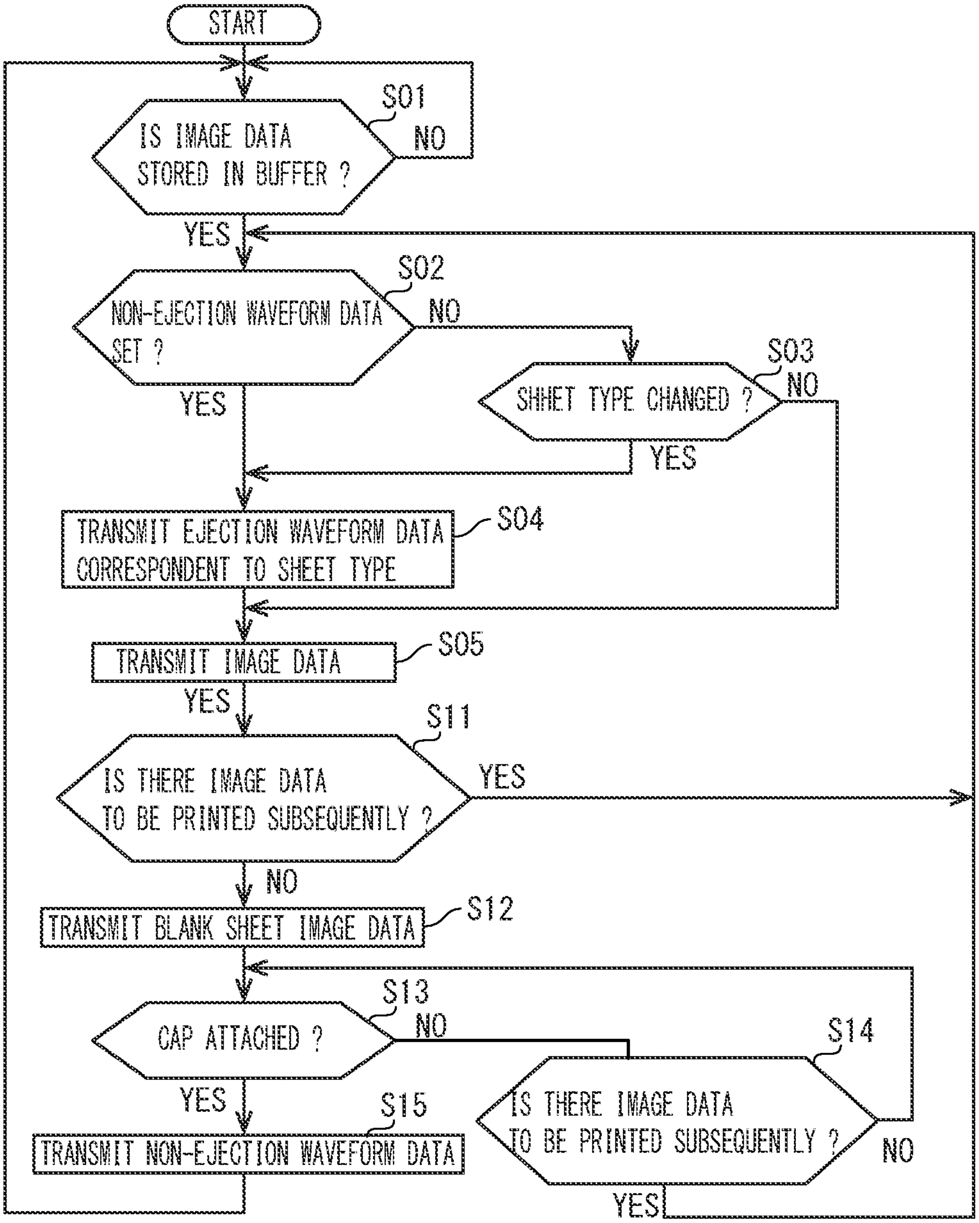
FIG. 15 is a flow chart explaining a control executed by a control circuit according to the embodiment of the present disclosure.

FIG. 15 is a flow chart explaining the control executed by the control circuit 40. When printer 1 is powered on, the control circuit 40 executes the processing shown in the figure. First, the control circuit 40 determines whether the image data is stored in the buffer 43 (step S01). If the image data is not stored in the buffer 43 (step S01: NO), the control circuit 40 repeats the determination of step S01. On the other hand, if the image data is stored in the buffer 43 (step S01: YES), the control circuit 40 determines whether the non-ejection waveform data is set (step S02). Specifically, the control circuit 40 refers to the nonvolatile memory 44, when the flag associated with the non-ejection waveform data is "0", the control circuit 40 determines that the non-ejection waveform data is not set (step S02: NO), and the processing proceeds to step S03. On the other hand, if the flag is "1", the control circuit 40 determines that the non-ejection waveform data is set (step S02: YES), and the processing proceeds to step S04.

In step S03, the control circuit 40 determines whether the type of the sheet S is changed. Specifically, if the sheet type data stored in the buffer 43 is different from the sheet type data stored in the nonvolatile memory 44, the control circuit 40 determines that the type of the sheet S is changed (step S03: YES), and the processing proceeds to step S04. On the other hand, if the sheet type data stored in the buffer 43 is the same as the sheet type data stored in the nonvolatile memory 44, the control circuit 40 determines that the type of the sheet S is not changed (step S03: NO), and the processing proceeds to step S05.

In step S04, the control circuit 40 transmits the ejection waveform data corresponding to the type of the sheet S to the driver 50. Specifically, the control circuit 40 transmits the ejection waveform data for plain paper when the type of the sheet S is a plain paper, and transmits the ejection waveform data A for thick paper when the type of the sheet S is a thick paper.

In step S05, the control circuit 40 reads the image data of one page from the buffer 43, transmits it to the driver 50, and erases it from the buffer 43. The control circuit 40 causes the nonvolatile memory 44 to store the sheet type data associated with the transmitted image data, and erases the sheet type data from the buffer 43.

Next, the control circuit 40 determines whether there is the image data to be subsequently printed after a predetermined time elapses from a time when the image data is transmitted to the driver 50 (step S11). Specifically, it is determined whether the image data is stored in the buffer 43. Here, the predetermined time is a time required after the image data is transmitted to the driver 50 until printing (ink ejection) corresponding to the image data is completed, and has a known length.

In step S11, it is determined whether the continuous printing continues, rather than whether there is the image data to be printed next. More specifically, in step S11, in a state where the continuous printing is performed on the sheet S conveyed at a predetermined interval, it is determined whether there is the image data for which such continuous printing continues. The state in which it is determined that there is no image data to be continuously printed in step S11 is set to the non-printing state.

If there is the image data to be subsequently printed (step S11: YES), the control circuit 40 repeats the processing after step S02. On the other hand, when there is no image data to be subsequently printed (step S11: NO), the control circuit 40 transmits blank image data to the driver 50 (step S12). The blank image data is image data in which the ink is not ejected from all nozzles 12N.

Next, the control circuit 40 determines whether the cap 72 is attached to the nozzle surface 12F of the inkjet head 12 (step S13). Specifically, the control circuit 40 inquires of the controller 2 whether the cap unit 70 is positioned at the cap position, determines that the cap 72 is attached when a response that the cap unit 70 is positioned at the cap position is obtained (step S13: YES), transmits the non-ejection waveform data to the driver 50 (step S15), and repeats the processing after step S01.

On the other hand, when a response that the cap unit 70 is not positioned at the cap position is obtained, the control circuit 40 determines that the cap 72 is not attached (step S13: NO), and determines whether there is the image data to be subsequently printed. If there is no image data to be subsequently printed (step S14: NO), the control circuit 40 repeats the processing after step S13. On the other hand, if there is the image data to be subsequently printed (step S14: YES), the control circuit 40 repeats the processing after step S02.

The above-described printer 1 according to the present embodiment includes a plurality of the nozzles 12N; the pressurizing element 12Z provided for each of the nozzles 12N; the driver 50 which drives the pressurizing elements 12Z; a controller 2 which generates image data indicating whether ink is ejected for each of the nozzles 12N; and a control circuit 40 which transmits ejection waveform data indicating a signal transmitted to the pressurizing element 12Z and the image data, wherein after printing according to the image data transmitted to the driver 50 is completed, in a non-printing state in which there is no image data to be subsequently printed, the control circuit 40 transmits at least one of the image data indicating a blank sheet and the ejection waveform data in which the ink is not ejected, to the driver 50. According to this configuration, the ink ejection due to noise during the waiting period can be suppressed.

Further, the printer 1 according to the present embodiment includes the first communication part 41 transmitting the ejection waveform data; and the second communication part 42 having a communication speed higher than that of the first communication part 41 and transmitting the image data, wherein after the printing according to the image data transmitted to the driver 50 is completed, in the non-printing state, the control circuit 40 transmits the image data indicating the blank sheet to the driver 50 via the second communication part 42, and then transmits the ejection waveform data in which the ink is not ejected, to the driver 50 via the first communication part 41. According to this configuration, compared with a case where the ejection waveform data in which the ink is ejected is transmitted earlier, the ink ejection due to noise can be suppressed early.

The printer 1 according to the present embodiment includes the cap 72 covering the nozzle surface 12F on which ejection ports 12A of the nozzles 12N are formed; and the attaching/detaching mechanism which attaches and detaches the cap 72 to and from the nozzle surface 12F; wherein after the printing according to the image data transmitted to the driver 50 is completed, in the non-printing state, the control circuit 40 transmits the image data indicating the blank sheet to the driver 50 via the second communication part 42, and then transmits the ejection waveform data in which the ink is not ejected, to the driver 50 via the first communication part 41 when the cap 72 is attached to the nozzle surface 12F. According to this configuration, when the image data is written before the cap 72 is attached, the printing cam be started without rewriting the ejection waveform data.

The printer 1 according to the present embodiment includes the buffer 43 in which image data received from the controller 2 is stored, wherein the control circuit 40 transmits the image data stored in the buffer 43 to the driver 50, and the non-printing state is a state in which the image data is not stored in the buffer 43 after the printing according to the image data transmitted to the driver 50 is completed. According to this configuration, it becomes possible to recognize that it becomes the non-printing state earlier than the case for inquiring of the controller 2.

The above embodiment may be modified as follows.

Figure 16:
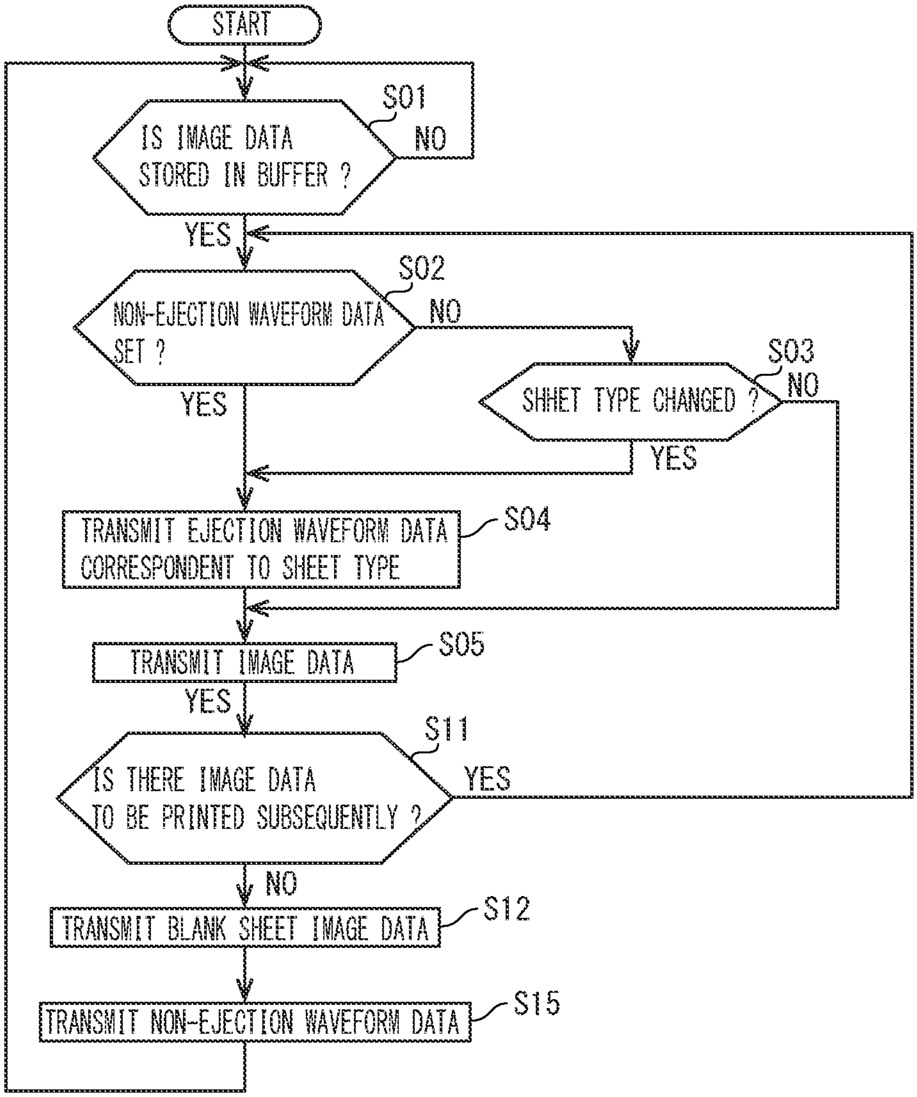
FIG. 16 is a flow chart explaining a first modified example according to the embodiment of the present disclosure.

[First Modified Example] FIG. 16 is a flowchart explaining the first modified example. In this example, steps S13 and S14 of the flow chart shown in FIG. 15 are omitted. According to this configuration, since the non-ejection waveform data is transmitted following the transmission of the blank image data without waiting for the attaching of the cap 72, the ejection of ink can be suppressed more than in the above embodiment.

[Second Modified Example] In the first modified example, the order of the step S12 and S15 may be reversed. According to this configuration, when the communication speed of the first communication part 41 is faster than that of the second communication part 42, the ink ejection due to noise can be suppressed earlier than in the above embodiment.

[Third Modified Example] In the first modified example, step S12 or step S15 may be omitted. According to this configuration, the communication amount can be suppressed more than in the above-described embodiment.

Figure 17:
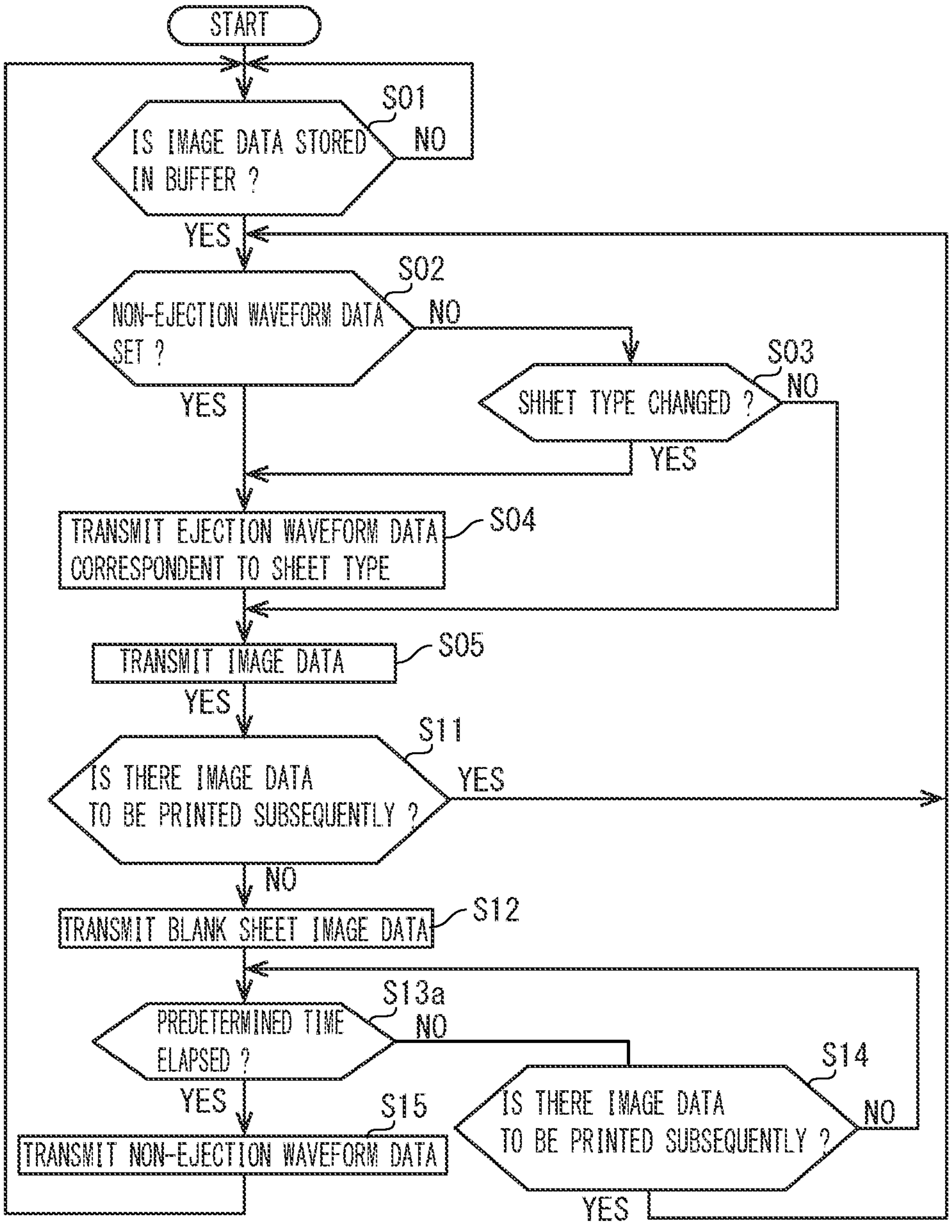
FIG. 17 is a flow chart explaining a fourth modified example according to the embodiment of the present disclosure.

[Fourth Modified Example] FIG. 17 is a flowchart explaining the fourth modified example. In this example, instead of step S13 in the flowchart shown in FIG. 15, it is configured to determine whether a predetermined time is elapsed (step S13*a*). That is, after printing according to the image data transmitted to the driver 50 is completed, the control circuit 40 transmits the image data indicating a blank sheet to the driver 50 via the second communication part 42 in a non-printing state, and then transmits the ejection waveform data in which the ink is not ejected to the driver 50 via the first communication part 41 when the image data is not written in the buffer 43 until a predetermined time elapses. According to this configuration, when the image data is written before the predetermined time elapses, printing can be started without rewriting the ejection waveform data. This configuration is suitable when the printer 1 is not provided with the cap unit 70.

[Fifth Modified Example] In the flowchart shown in FIG. 15, the control circuit 40 may be configured to transmit the non-ejection waveform data to the driver 50 first. According to this configuration, it is possible to prevent the ink from being ejected due to noise during the waiting period until the first printing is performed after the power is turned on.

[Sixth Modified Example] In the flowchart shown in FIG. 15, the control circuit 40 may be configured to transmit the ejection waveform data for plain paper to the driver 50 first. According to this configuration, when the first printing after the power is turned on is printing on a plain paper, the printing can be started earlier than in the fifth modified example.

The invention claimed is:

1. An inkjet recording apparatus comprising:
- a plurality of nozzles;
- a pressurizing element provided for each of the nozzles;
- a driver which drives the pressurizing elements;
- a controller which generates image data indicating whether ink is ejected for each of the nozzles;
- a control circuit which transmits ejection waveform data indicating a signal transmitted to the pressurizing element and the image data;
- a first communication part transmitting the ejection waveform data; and
- a second communication part having a communication speed higher than that of the first communication part and transmitting the image data, wherein
- after the printing according to the image data transmitted to the driver is completed, in a non-printing state in which there is no image data to be subsequently printed, the control circuit transmits the image data indicating a blank sheet to the driver via the second communication part, and then transmits the ejection waveform data in which the ink is not ejected, to the driver via the first communication part.

2. The inkjet recording apparatus according to claim 1, further comprising:
- a cap covering a nozzle surface on which ejection ports of the nozzles are formed; and
- an attaching/detaching mechanism which attaches and detaches the cap to and from the nozzle surface; wherein
- after the printing according to the image data transmitted to the driver is completed, in the non-printing state, the control circuit transmits the image data indicating the blank sheet to the driver via the second communication part, and then transmits the ejection waveform data in which the ink is not ejected, to the driver via the first communication part when the cap is attached to the nozzle surface.

3. The inkjet recording apparatus according to claim 1, further comprising:
- a buffer in which the image data received from the controller is stored, wherein
- the control circuit transmits the image data stored in the buffer to the driver, the non-printing state is a state in which the image data is not stored in the buffer after the printing according to the image data transmitted to the driver is completed, and after the printing according to the image data transmitted to the driver is completed, in the non-printing state, the control circuit transmits the image data indicating the blank sheet to the driver via the second communication part, and then transmits the ejection waveform data in which the ink is not ejected, to the driver via the first communication part when image data is not written in the buffer until a predetermined time elapses.

4. The inkjet recording apparatus according to claim 1, wherein the ejection waveform data differs according to a type of the sheet.

5. The inkjet recording apparatus according to claim 4, wherein the driver is an integrated circuit having a register, only when the type of the sheet is changed, the ejection waveform data corresponding to the changed type and the image data are transmitted, only the image data is transmitted when the type of the sheet is not changed, and the image data is transmitted only once and a sheet number data indicating a number of the sheet assigned by a print job is transmitted when printing a plurality of the sheets with the same image data without changing the type of the sheet is performed.

6. An inkjet recording apparatus comprising:

a plurality of nozzles;

a pressurizing element provided for each of the nozzles;

a driver which drives the pressurizing elements;

a controller which generates image data indicating whether ink is ejected for each of the nozzles;

a control circuit which transmits ejection waveform data indicating a signal transmitted to the pressurizing element and the image data; and a buffer in which the image data received from the controller is stored, wherein the control circuit transmits the image data stored in the buffer to the driver, after printing according to the image data transmitted to the driver is completed, in a non-printing state in which there is no image data to be subsequently printed, the control circuit transmits at least one of the image data indicating a blank sheet and the ejection waveform data in which the ink is not ejected, to the driver, and the non-printing state is a state in which the image data is not stored in the buffer after the printing according to the image data transmitted to the driver is completed.

* * * * *